US008584231B2

(12) United States Patent
Zou (10) Patent No.: US 8,584,231 B2
(45) Date of Patent: Nov. 12, 2013

(54) SERVICE OPENING METHOD AND SYSTEM, AND SERVICE OPENING SERVER (71) Applicant: Huawei Technologies Co., Ltd., Guangdong (CN)

(72) Inventor: Xianjun Zou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/621,554

(22) Filed: Sep. 17, 2012

(65) Prior Publication Data

US 2013/0019291 A1    Jan. 17, 2013

Related U.S. Application Data (63) Continuation of application No. PCT/CN2011/071071, filed on Feb. 18, 2011.

(30) Foreign Application Priority Data

Mar. 17, 2010    (CN) .......................... 2010 1 0136980

(51) Int. Cl.
G06F 7/04    (2006.01)

(52) U.S. Cl.
USPC ........ 726/21; 726/4; 726/17; 726/2; 713/155; 713/159

(58) Field of Classification Search
None
See application file for complete search history.

(56) References Cited

U.S. PATENT DOCUMENTS

2008/0046983 A1* 2/2008 Lester et al. ...................... 726/5
2009/0271847 A1* 10/2009 Karjala et al. .................... 726/6

FOREIGN PATENT DOCUMENTS

| CN | 101127625 A | 2/2008 |
| CN | 101616126 A | 12/2009 |
| JP | 2002-222251 A | 8/2002 |
| WO | WO 2009/068603 A2 | 6/2009 |

OTHER PUBLICATIONS

International Search Report in corresponding International Patent Application No. PCT/CN2011/071071 (May 26, 2011).
Written Opinion of the International Searching Authority in corresponding International Patent Application No. PCT/CN2011/071071 (May 26, 2011).
"IEEE P1903/D1; Draft Architecture Document for Next Generation Service Overlay Network," May 2009, IEEE, New York, New York.
"IEEE P1903/D1; Draft Architecture Document for Next Generation Service Overlay Network," Mar. 2010, IEEE, New York, New York.

* cited by examiner

Primary Examiner — Pramila Parthasarathy
(74) Attorney, Agent, or Firm — Leydig, Voit & Mayer, Ltd.

(57) ABSTRACT

Embodiments of the present invention relate to a service opening method and system, and a service opening server. The method includes: receiving a service request from a third-party application, where the service request carries type and parameter information of the requested service; querying, according to the type information of the service, a service directory to obtain an access address and authentication type information of the requested service; when it is determined that the invoking of the service needs an authorization of an end user, obtaining an authorization notification message of the end user according to the type information of the service and the parameter information of the service; and forwarding, the service request to a capability server, and forwarding, to the third-party application, a service response message returned by the capability server. The control of the end user on the authorized service is ensured to the greatest extent.

7 Claims, 7 Drawing Sheets

SERVICE OPENING METHOD AND SYSTEM, AND SERVICE OPENING SERVER

CROSS-REFERENCE TO RELATED APPLICATIONS

This application is a continuation of International Patent Application No. PCT/CN2011/071071, filed on Feb. 18, 2011, which claims priority to Chinese Patent Application No. 201010136980.X, filed on Mar. 17, 2010, both of which are hereby incorporated by reference in their entireties.

FIELD OF THE INVENTION

Embodiments of the present invention relate to the field of network technologies, and in particular, to a service opening method and system, and a service opening server.

BACKGROUND OF THE INVENTION

With the flourishing development of telecommunications and the Internet as well as the great abundance of information resources, openness of various services has become a research focus. Internet vendors open valuable service resources, and telecommunication operators also open telecommunication services in multiple manners, so that the network ecological chain flourishes to achieve an all-win purpose. Certainly, an application programming interface (API) cannot conveniently open all services to third-party applications, and moreover, in the current environment, it is reasonable that many service resources are opened after an end user at the client side authorizes the resources or after a user identity verification is performed. For example, when opening private information of users, the API needs to directly charge at the terminal side for services opened by the telecommunication operators, verifies and authorizes private information of users.

In the conventional art, telecommunication operators open telecommunications services (for example, SMS message, WAP PUSH, and multimedia message) to the third-party applications through an integrated service access gateway (ISAG). The ISAG application provides a Parlay X2.0 interface which is in compliance with the international standards, enhances the interface properly, and provides richer service resources. The ISAG hides the complexity of the underlying network, and achieves high abstraction of services such as mobile data, mobile voice, personal handy-phone system (PHS), and encapsulates the services into an open, unified, and standard application development interface which is then provided to content providers/service providers (CPs/SPs), and supports accesses of telecommunication operators self-run value-added services, accesses of third-party CP/SP value-added services or accesses of enterprise applications. The ISAG provides CPs/SPs with integrated development and test environment for unified value-added applications; and implements functions, such as verification, authentication, charging and management, in the service application process, in coordination and combination with an integrated services management platform (ISMP).

The ISAG application can solve the authentication problem between service developers (that is, users of capability APIs) and the operators, but still cannot solve the problem that exists when end users authenticate requested services.

SUMMARY OF THE INVENTION

The objective of embodiments of the present invention is to provide a service opening method and system, and a service opening server, so as to ensure an end user's control and processing capabilities on services requiring authorization and ensure interests of the end user.

An embodiment of the present invention provides a service opening method, where the method includes:

receiving a service request from a third-party application, where the service request carries type information of a requested service and parameter information of the requested service;

according to the type information of the service, querying a service directory to obtain an access address and authentication type information of the requested service; and when it is determined, according to the authentication type information, that the invoking of the service needs an authorization of an end user, according to the type information of the service and the parameter information of the service, obtaining an authorization notification message of the end user; and according to the access address, forwarding the service request to a capability server, and forwarding, to the third-party application, a service response message returned by the capability server.

An embodiment of the present invention provides a service opening server, where the server includes:

a receiving module, configured to receive a service request from a third-party application, where the service request carries type information of a requested service and parameter information of the requested service;

a first obtaining module, configured to query, according to the type information of the service, a service directory to obtain an access address and authentication type information of the service;

a second obtaining module, configured to, when it is determined, according to the authentication type information, that the invoking of the service needs an authorization of an end user, obtain an authorization notification message of the end user according to the type information of the service and the parameter information of the service; and a forwarding module, configured to forward, according to the access address, the service request to a capability server, and forward, to the third-party application, a service response message returned by the capability server.

An embodiment of the present invention provides a service opening system, where the system includes a first server and a second server on which a third-party application is set, where the first server is the service opening server described in the foregoing technical solutions.

The first server receives a service request from the third-party application set on the second server, where the service request carries type information of a requested service and parameter information of the requested service; the first server queries, according to the type information of the service, a service directory to obtain an access address and authentication type information of the service; when it is determined, according to the authentication type information, that the invoking of the service needs an authorization of an end user, the first server obtains an authorization notification message of the end user according to the type information of the service and the parameter information of the service; and the first server forwards, according to the access address, the service request to a capability server, and forwards, to the third-party application, a service response message returned by the capability server.

In the service opening method and system, and the service opening server provided by the embodiments of this present invention, if it is determined, according to the authentication type information, that the invoking of the requested service needs an authorization of an end user, an authorization notification message of the end user is obtained according to the type information of the service and the parameter information of the service. In this manner, the control of the end user on the authorized service is ensured to the greatest extent, and an untrusted third-party application is effectively prevented from violating interests of the end user, thereby ensuring the interests of the end user.

BRIEF DESCRIPTION OF THE DRAWINGS

To describe the technical solutions according to embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions according to the embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Because a lot of service resources are closely associated with an end user corresponding to a client in a service opening scenario, for example, personal information and friends list of a user, and a service which is intended to directly charge the end user corresponding to the client. The opening of the service resources need to be authenticated and authorized by the end user corresponding to the client.

Figure 1:
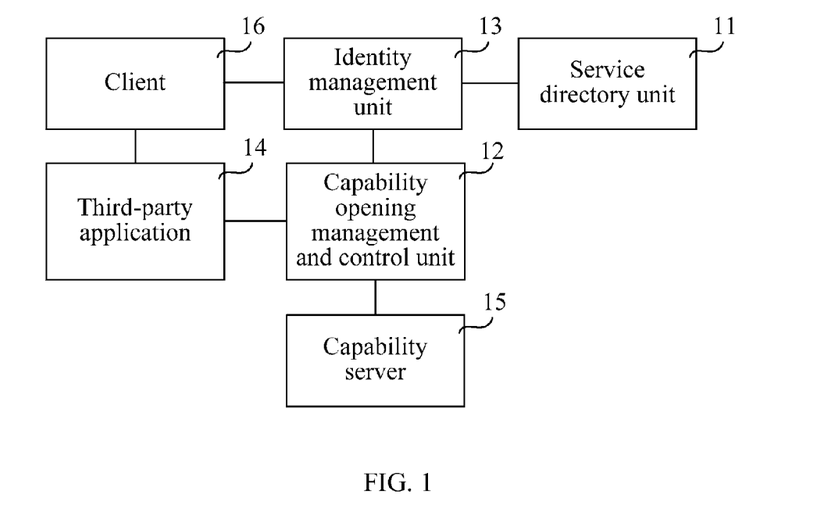
FIG. 1 is a schematic architecture diagram of a system applicable to an embodiment of the present invention.

FIG. 1 is a schematic architecture diagram of a system applicable to an embodiment of the present invention. As shown in FIG. 1, functional units in the system architecture mainly include a service directory unit 11, a capability opening management and control unit 12, and an identity management (Identity Management, IDM for short) unit 13. The service directory unit 11 is configured to implement publication and discovery of a service, and access description information and an access address of the service, where the description information of the service includes type information and parameter information; the capability opening management and control unit 12 is configured to aggregate and encapsulate various types of services which have been registered, provide a unified opening interface to the outside, and provide a proper route between a service requester and a requested service; and the identity management unit 13 is configured to implement the authentication and authorization of a user, including providing a user interface address (for example, a URL) for the user to log in for authentication. Furthermore, functions of the service directory unit 11, the capability opening management and control unit 12, and the identity management unit 13 may be specifically implemented by a service opening server in practical applications.

In addition, in the embodiment shown in FIG. 1, the system architecture further includes a third-party application 14, a capability server 15, and a client (Client) 16. The third-party application 14 is configured to subscribe to a service provided by the embodiment of the present invention, and provide a service for an end user that uses the client 16, where the third-party application 14 may specifically be an application provided by a service provider; the capability server 15 is configured to serve as a capability server registered in the system environment described in the embodiment of the present invention, where the capability server 15 may specifically be a location server of the service provider; and the end user uses the third-party application 14 through the client 16.

Figure 2:
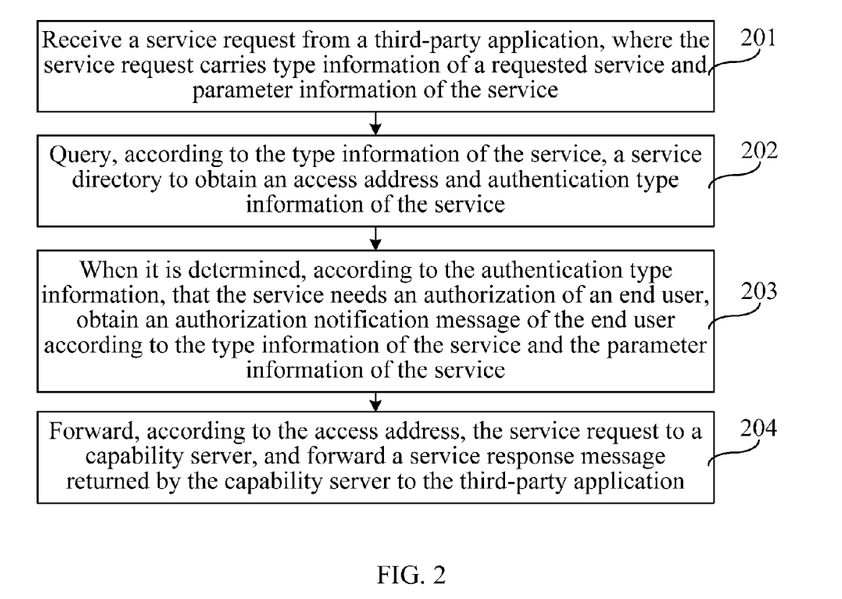
FIG. 2 is a schematic flowchart of an embodiment of a service opening method according to the present invention.

FIG. 2 is a schematic flowchart of an embodiment of a service opening method according to the present invention. As shown in FIG. 2, this embodiment includes the following steps.

Step 201: Receive a service request from a third-party application, where the service request carries type information of a requested service and parameter information of the service.

Step 202: Query, according to the type information of the service, a service directory to obtain an access address and authentication type information of the service.

Step 203: When it is determined, according to the authentication type information, that the service needs an authorization of an end user, obtain an authorization notification message of the end user according to the type information of the service and the parameter information of the service.

Step 204: Forward, according to the access address, the service request to a capability server, and forward, to the third-party application, a service response message returned by the capability server.

In the service opening method provided by the embodiment of the present invention, when it is determined, according to the authentication type information, that the invoking of the requested service needs an authorization of an end user, an authorization notification message from the end user is obtained according to the type information of the requested service and the parameter information of the requested service. In this manner, the control of the end user on the authorized service is ensured to the greatest extent, and an untrusted third-party application is prevented from violating interests of the end user effectively, thereby ensuring the interests of the end user.

Figure 3:
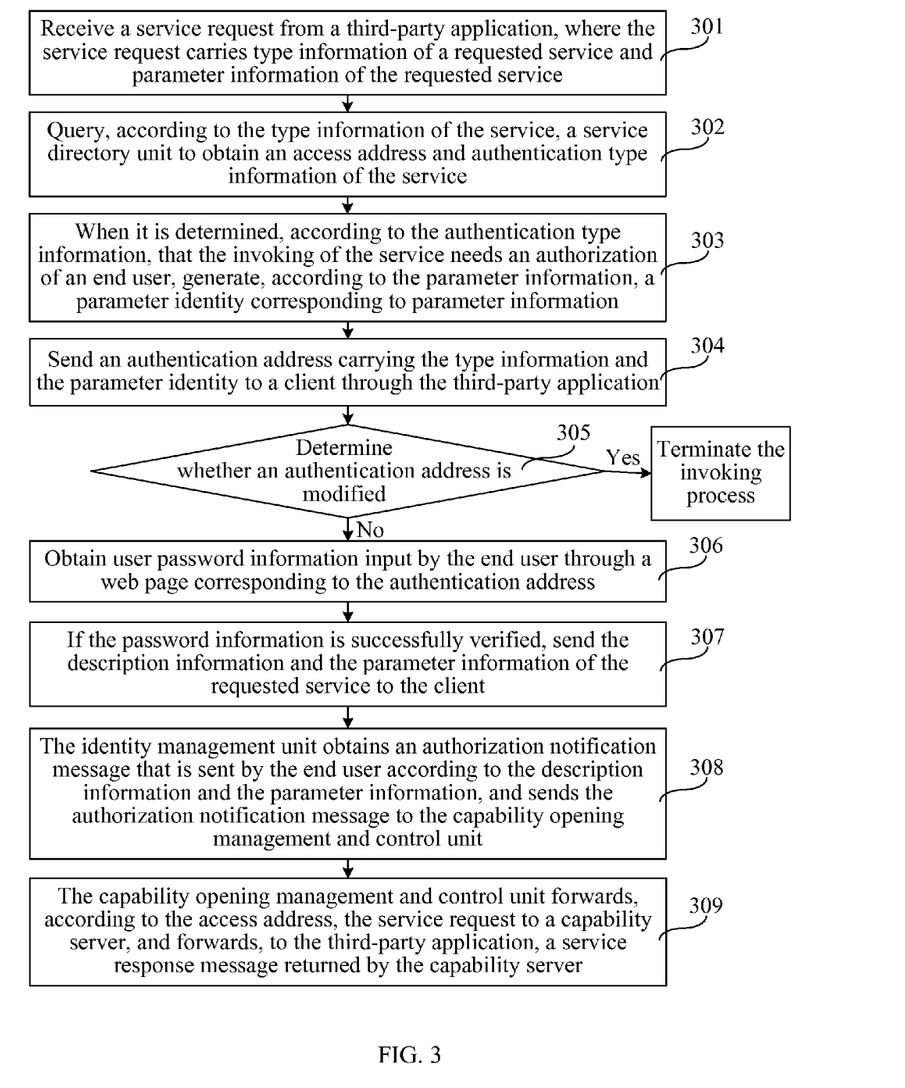
FIG. 3 is a schematic flowchart of another embodiment of a service opening method according to the present invention.

FIG. 3 is a schematic flowchart of another embodiment of the service opening method according to the present invention. This embodiment includes the following steps:

Step 301: Receive a service request from a third-party application, where the service request carries type information of a requested service and parameter information of the requested service.

The third-party application may be hosted on a server, and is capable of subscribing to a service provided by a service provider (Service Provider, SP for short); the type information of the service may specifically be services indicated by ordinary strings such as weather, SMS message and/or stock information query; the parameter information of the service may further include an end user's identity (ID) through which a server device related to this embodiment of the present invention is enabled to identify identity information of the end user.

Step 302: Query, according to the type information of the service, a service directory unit to obtain an access address and authentication type information of the service.

The authentication type information may specifically include: a service may be invoked from the SP without an authorization of an end user, a service may be invoked from the SP with an authorization of the end user, and a service may be invoked with an authorization of the SP. Certainly, for different services, different authentication types may be set according to a security level designated by the end user.

Step 303: When it is determined, according to the authentication type information, that the invoking of the service needs an authorization of an end user, generate, according to the parameter information, a parameter identity (ID) corresponding to the parameter information.

Because the parameter information includes specific parameters for accessing a service, for example, if a picture is uploaded, the parameter information includes picture content of the picture. For the generation of a parameter identity corresponding to parameter information according to the parameter information, reference may be made to an implementation scheme in the prior art, where the parameter identity may be a simple string. Furthermore, because information amount of the parameter information is greater than that of the parameter identity, during the process that a server device transmits information, the load of information transmission over a network may be decreased by using the parameter identity.

Step 304: Send an authentication address carrying the type information and the parameter identity to a client through the third-party application.

The authentication address may specifically be a uniform/universal resource locator (Uniform/Universal Resource Locator, URL for short) for authentication. Because the URL is generated according to the type information and the parameter identity, the URL carries the type information and the parameter identity (ID). In addition, the URL may further carry token (TOKEN) information, where the token (TOKEN) information is used to perform token encryption on other information except the token (TOKEN) part in the URL, so as to prevent a third-party application from tampering with the URL during the transfer of the URL for authentication, and the other information may be at least one of: an authentication address, a parameter identity, and a service type.

Step 305: A client uses a browser to access an identity management unit through the authentication address, and the identity management unit determines whether the authentication address is modified, and if yes, it indicates that the authentication address has been modified, terminate the invoking process; if no, it indicates that the authentication address has not been modified, perform step 306.

Step 306: Obtain user password information input by the end user through a web page corresponding to the authentication address.

Step 307: If the password information is successfully verified, send description information and the parameter information of the requested service to the client.

The description information and the parameter information which is carried in a service request need to be obtained. The description information of the service to be requested may be obtained through the following procedure, for example, querying, according to a service type, a service directory to obtain the description information; obtaining, according to the parameter identity, the parameter information carried in the service request; and then sending the description information and the parameter information to the client.

Step 308: The identity management unit obtains an authorization notification message, where the authorization notification message is sent by the end user according to the description information and the parameter information, and sends the authorization notification message to a capability opening management and control unit.

Step 309: The capability opening management and control unit forwards the service request to a capability server according to the access address, and forwards, to the third-party application, a service response message returned by the capability server.

In the service opening method provided by the embodiment of the present invention, if it is determined, according to the authentication type information, that the service corresponding to the service request needs an authorization of an end user at the client side, an authorization notification message of the client is obtained according to the parameter information of the service. In this manner, the control of the client on the authorized service is ensured to the greatest extent, and an untrusted third-party application is effectively prevented from violating interests of the end user, thereby ensuring the interests of the end user.

Furthermore, based on the embodiments shown in FIG. 2 and FIG. 3, if the service request of the third-party application carries a callback address, the forwarding, to the third-party application, the service response message returned by the capability server may specifically be:

forwarding, to the third-party application corresponding to the callback address, the service response message returned by the capability server; specifically, if the callback address indicates the third-party application which initially sends the service request, sending the service response message to a third-party application which initially sends the service request; if the callback address indicates a third-party application which does not initially send the service request, sending the service response message to other third-party applications. The callback address may specifically be an Internet protocol (Internet Protocol, IP for short) address of a server where the third-party application is located and a port number corresponding to the IP address, or an full qualified domain name and a port corresponding to the full qualified domain name, but is not limited to the foregoing listed cases, provided that the service response message returned by the capability server can be forwarded to the third-party application corresponding to the callback address according to the callback address.

Figure 4A:
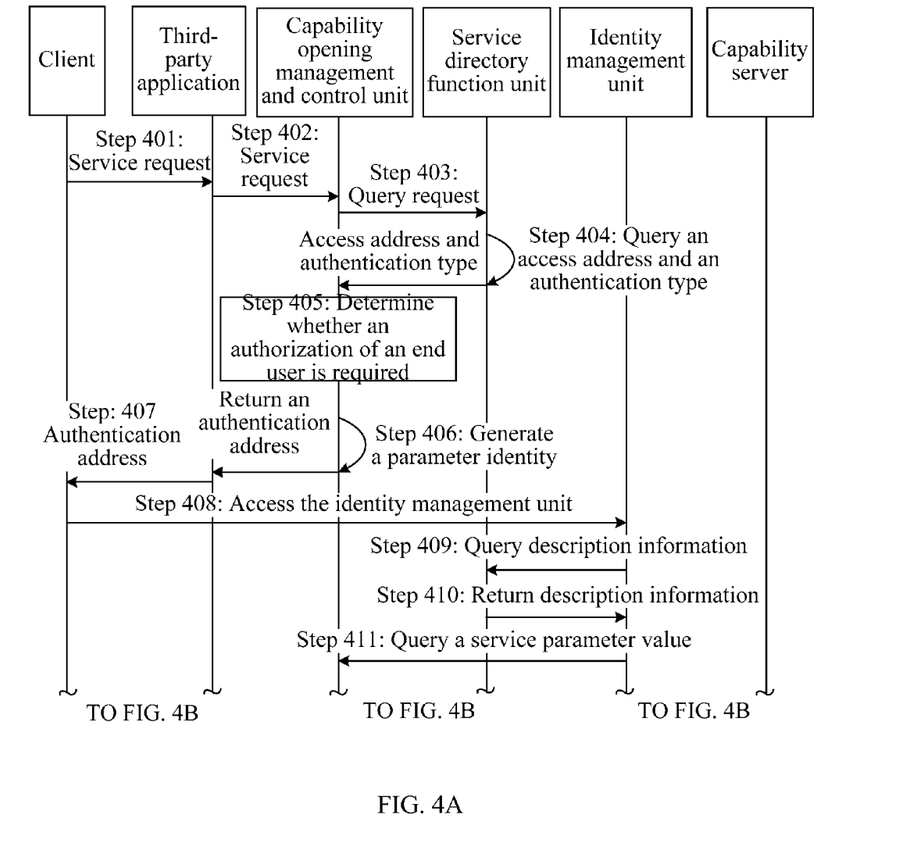
FIG. 4A and FIG. 4B are a signaling flowchart applicable to an embodiment of the present invention.
Figure 4B:
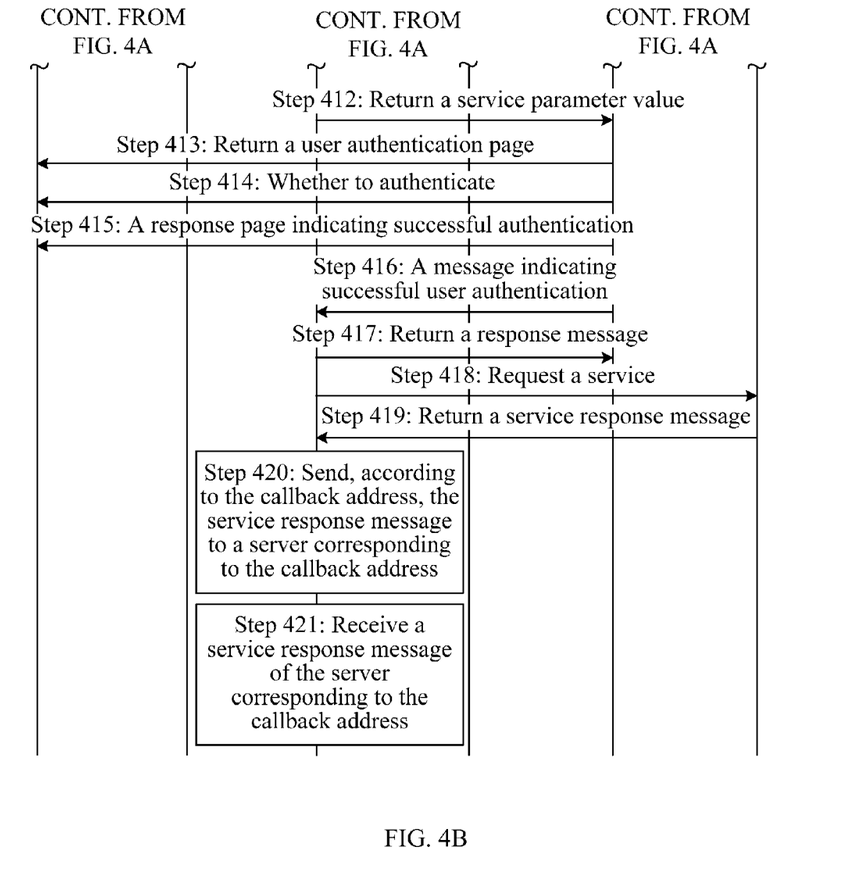

FIG. 4 is a signaling flowchart applicable to an embodiment of the present invention. This embodiment is applicable to a scenario in which a third-party application is hosted on a server and a callback address needs to be provided by the third-party application hosted on the server. In addition, a service directory unit, a capability opening management and control unit and an identity management unit according to the embodiment of the present invention may be deployed on different servers, and certainly, may also be deployed on the same server. The embodiment of the present invention does not limit the deployment of the three units, provided that corresponding functions can be implemented. As shown in FIG. 4, this embodiment includes the following steps:

Step 401: An end user sends a service request to a third-party application through a client.

The third-party application may be hosted on a server, and is capable of subscribing to a service provided by a service provider (Service Provider, SP for short).

Step 402: The third-party application sends a service request to the capability opening management and control unit, where the service request carries type information of a requested service, parameter information of the service and a callback address.

The type information of the service may specifically be services indicated by ordinary strings, such as weather, SMS message and stock information query; the parameter information of the service may further include an identity (ID) of an end user. The callback address may specifically be an Internet protocol (Internet Protocol, IP for short) address of a server where the third-party application is located and a port number corresponding to the IP address, or an full qualified domain name and a port corresponding to the full qualified domain name, but is not limited to the foregoing listed cases, provided that the service response message returned by the capability server can be forwarded, according to the callback address, to the third-party application corresponding to the callback address.

Step 403: The capability opening management and control unit sends, according to the type information, a query request to the service directory functional unit.

The query request may specifically be a hypertext transfer protocol (Hypertext Transfer Protocol, HTTP for short) query request.

Step 404: The service directory functional unit queries, according to the query request, an access address and the authentication type information that correspond to the type information, and returns the access address and the authentication type information of the service to the capability opening management and control unit.

The authentication type information may specifically include: a service may be invoked from the SP without an authorization of an end user, a service may be invoked from the SP with an authorization of the end user, and a service may be invoked from the SP with an authorization of the service provider. For different services, different authentication types may be set according to a security level designated by the end user.

Step 405: The capability opening management and control unit determines, according to the authentication type information returned by the service directory functional unit, whether the service request needs an authorization of the end user at a client side.

Step 406: If it is determined that the service request needs the authorization of the end user, the capability opening management and control unit stores parameter information, generates a parameter identity (ID) corresponding to the parameter information, and returns an authentication address generated according to the type information and the parameter identity to the third-party application.

For the generation of the parameter identity corresponding to the parameter information according to the parameter information, reference may be made to an implementation scheme in the prior art, where the parameter identity may specifically be a simple string. The authentication address may be a URL for authentication. Because the URL is generated according to the type information and the parameter identity, the URL carries both the type information and the parameter identity (ID). In addition, the URL may further carry token (TOKEN) information, where the token (TOKEN) information is used to perform token encryption on other information (for example, at least one of: the authentication address, the parameter identity and the service type) except the token (TOKEN) part in the URL, so as to prevent the third-party application from tampering with the URL during the transfer of the URL for authentication. Specifically, a hash (hash) algorithm may be used to perform the token encryption on the information.

Step 407: The third-party application transfers the URL for authentication to the client.

Step 408: The end user accesses the identity management unit through the URL of the client.

Step 409: After determining, according to the token (TOKEN) information in the URL, that the URL is not modified during the process, the identity management unit queries the service directory unit for description information corresponding to the type information.

Step 410: The service directory unit returns the description information to the identity management unit.

Step 411: The identity management unit queries the capability opening management and control unit for a service parameter value (param value) corresponding to the parameter identity (ID).

Step 412: The capability opening management and control unit returns the service parameter value to the identity management unit.

Step 413: The identity management unit returns a user authentication page to the client, so that the end user can log in through the user authentication page of the client.

Step 414: After obtaining, through the client, password information input by the user, the identity management unit presents the description information and the service parameter value of the service to the client, and sends, to the client, a request for querying whether to authorize the service for this time.

Step 415: If the client receives the end user's an authorization notification message of agreeing to grant authorization, the client sends, to the identity management unit, the authorization notification message of agreeing to grant authorization, and the identity management unit returns, to the client, a response page indicating successful authentication.

Step 416: The identity management unit sends, to the capability opening management and control unit, a message indicating that the user authentication succeeds.

Step 417: The capability opening management and control unit returns a response message to the identity management unit.

Through the process of step 401 to step 417, the end user implements the procedure of authorizing a service requested. After the authorization performed by the end user, the process of the following step 418 to step 421 may be used to access a service provided by a capability provider according to the service request; or, when the third-party application sends the service request again, the process of the following step 418 to step 421 may also be used to access a service provided by the capability provider.

Step 418: The capability opening management and control unit requests, according to the access address of the service, the capability server where the capability provider is located to provide the service corresponding to the parameter information.

Step 419: The capability opening management and control unit receives a service response message returned by the capability server.

Step 420: The capability opening management and control unit sends, according to the callback address carried in the service request, the service response message to a server corresponding to the callback address.

Step 421: The capability opening management and control unit receives a service response message from the server corresponding to the callback address.

For example, if the service requested by the service request is "weather forecast (weather)" in an area A, the service response message may request a service corresponding to the service request for this time, that is, the specific content of the weather forecast in the area A, for example, weather conditions in the last three days. The specific content corresponding to the service may be determined by the SP.

In the service opening method provided by the embodiment of the present invention, if it is determined, according to the authentication type information, that the invoking of the requested service needs an authorization of an end user, an authorization notification message of the end user is obtained according to the type information of the service and the parameter information of the service. In this manner, the control of the end user on the authorized service is ensured to the greatest extent, and an untrusted third-party application is effectively prevented from violating interests of the end user, thereby ensuring the interests of the end user. In addition, the opening scale of the service capability is enriched and richer service capabilities are provided to the third-party application, so that the whole ecological chain flourishes.

Figure 5A:
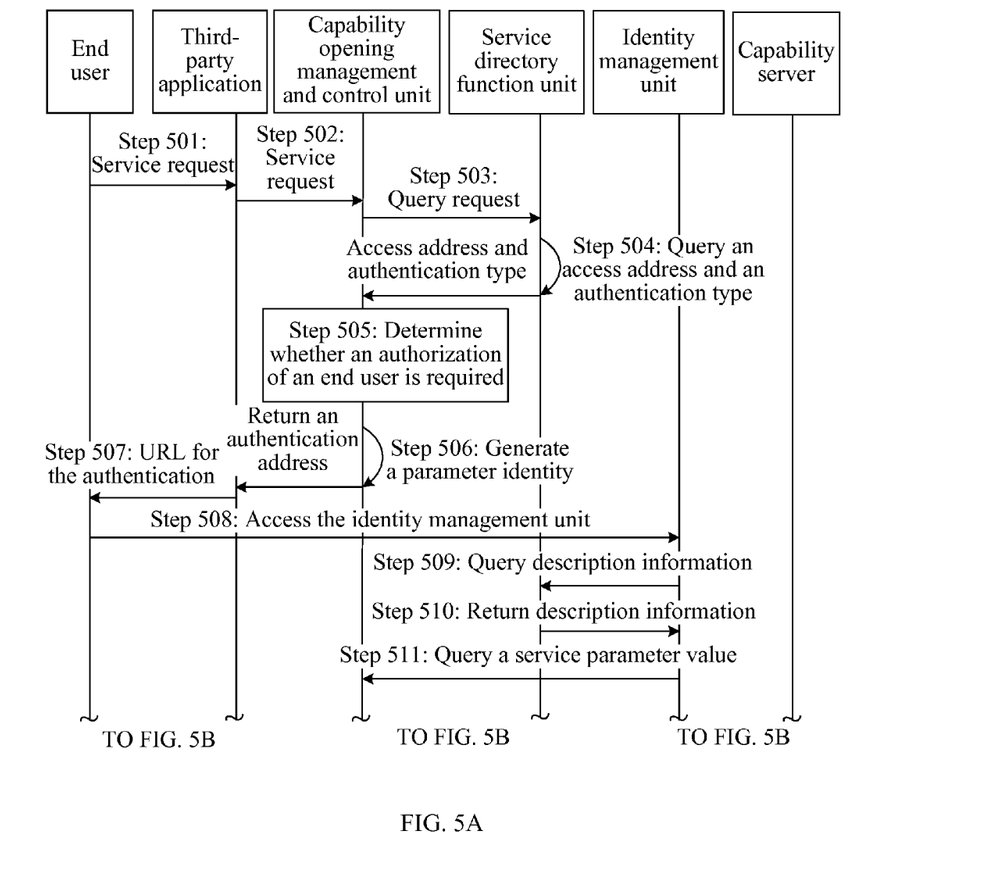
FIG. 5A and FIG. 5B are another signaling flowchart applicable to an embodiment of the present invention.
Figure 5B:
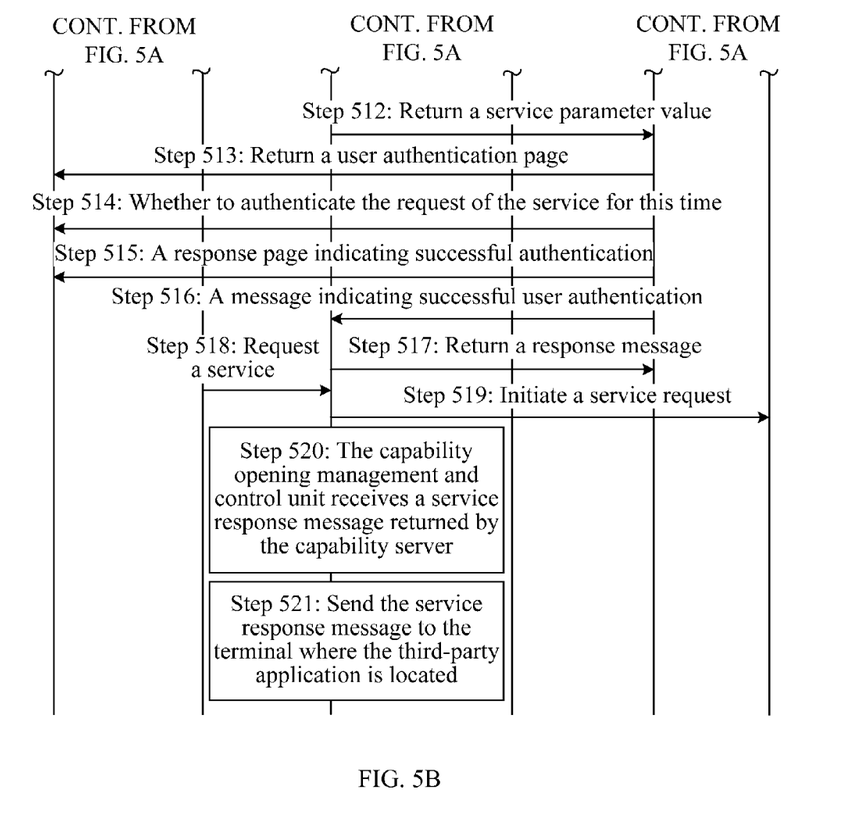

FIG. 5 is another signaling flowchart applicable to an embodiment of the present invention. This embodiment is not only applicable to a case that a third-party application is hosted on a server, but also applicable to a case that the third-party application is hosted on a terminal (the terminal may specifically be a smart phone, an ordinary mobile phone, a personal computer or a notebook computer), and applicable to a scenario in which it is not convenient to provide a callback address. This embodiment includes the following steps:

Step 501: An end user sends, through a third-party application, a service request to a server.

Parameter information of the service includes the end user's identity (ID) through which a server device related to this embodiment of the present invention is enabled to identify identity information of the end user.

Step 502: The third-party application sends a service request to a capability opening management and control unit, where the service request carries type information of a service to be requested and parameter information of the service to be requested.

The type information of the service may specifically be services indicated by ordinary strings, such as weather, SMS message and stock information query; the parameter information of the service may further include an identity (ID) of the end user.

Step 503: The capability opening management and control unit sends, according to the type information, a query request to the service directory functional unit.

The query request may specifically be a hypertext transfer protocol (Hypertext Transfer Protocol, HTTP for short) query request.

Step 504: The service directory functional unit queries, according to the query request, an access address and the authentication type information that correspond to the type information, and returns the access address and the authentication type information of the service to the capability opening management and control unit.

The authentication type information may specifically include: a service may be invoked from an SP without an authorization of an end user, a service may be invoked from the SP with an authorization of the end user, and a service may be invoked from the SP with an authorization of the service provider. For different services, different authentication types may be set according to a security level designated by the end user.

Step 505: The capability opening management and control unit determines, according to the authentication type information returned by the service directory functional unit, whether the service request needs to use an authorization of the end user of a terminal.

Step 506: If it is determined that the service request needs the authorization of the end user, the capability opening management and control unit stores the parameter information of the service, generates a parameter identity (ID) corresponding to the parameter information of the service, and returns an authentication address generated according to the type information and the parameter identity to the third-party application.

For the generation of the parameter identity corresponding to the parameter information according to the parameter information, reference may be made to an implementation scheme in the prior art, where the parameter identity may specifically be a simple string. The authentication address may be a URL for authentication. Because the URL is generated according to the type information and the parameter identity, the URL carries both the type information and the parameter identity (ID). In addition, the URL may further carry token (TOKEN) information, where the token (TOKEN) information is used to perform token encryption on other information (for example, at least one of: the authentication address, the parameter identity and the service type) except the token (TOKEN) part in the URL, so as to prevent the third-party application from tampering with the URL during the transfer of the URL for authentication. Specifically, a hash (hash) algorithm may be used to perform the token encryption on the information.

Step 507: The third-party application transfers the URL for authentication to the terminal.

Step 508: The terminal of the end user accesses an identity management unit through the URL.

Step 509: After determining, according to the token (TOKEN) information in the URL, that the URL is not modified during the process, the identity management unit queries the service directory unit for description information corresponding to the service type.

Step 510: The service directory unit returns the description information to the identity management unit.

Step 511: The identity management unit queries the capability opening management and control unit for a service parameter value (param value) corresponding to the service parameter identity (ID).

Step 512: The capability opening management and control unit returns the service parameter value to the identity management unit.

Step 513: The identity management unit returns a user authentication page to the terminal, so that the end user can log in through the user authentication page on the terminal.

Step 514: After the terminal obtains user password input by the user, the identity management unit presents the service description and the service parameter value of the service to the terminal, and sends, to the terminal, a request for querying whether to authorize the service for this time.

Step 515: If the client receives an authorization notification message of agreeing to grant authorization of the end user, the client sends the authorization notification message to the identity management unit, and the identity management unit returns, to the client, a response page indicating successful authentication.

The response page further includes an access token (Access Token) for the service which has been authorized and may be invoked.

Step 516: The identity management unit sends, to the capability opening management and control unit, a message indicating that the user authentication succeeds and a corresponding access token (Access Token).

Step 517: The capability opening management and control unit returns a response message to the identity management unit.

Through the process of step 501 to step 517, the end user implements the procedure of authorizing a requested service. After the authorization performed by the end user, the process of the following step 518 to step 521 may be used to access a service provided by a capability provider according to the service request; or, when the third-party application sends the service request again, the process of the following step 518 to step 521 may also be used to access a service provided by the capability provider.

Step 518: Through the third-party application hosted on the terminal, the end user initiates a service request to the capability opening functional unit, where the service request carries an access token (Access Token).

Step 519: After confirming that the access token (Access Token) is the access token in step 515, the capability opening functional unit initiates a service request to a capability server where a registered capability provider is located.

Step 520: The capability opening management and control unit receives a service response message returned by the capability server.

Step 521: The capability opening management and control unit sends the service response message to the terminal where the third-party application is located.

For example, if the service requested by the service request is "weather forecast (weather)" in an area A, the service response message may request a service corresponding to the service request for this time, that is, the specific content of the weather forecast in the area A, for example, weather conditions in the last three days. The specific content corresponding to the service may be determined by the SP.

In the service opening method provided by the embodiment of the present invention, if it is determined, according to the authentication type information, that the server corresponding to the service request needs an authorization of an end user at the client side, an authorization notification message of the client is obtained according to the parameter information of the service. In this manner, the control of the client on the authorized service is ensured to the greatest extent, and an untrusted third-party application is effectively prevented from violating interests of the end user, thereby ensuring the interests of the end user. In addition, the opening scale of the service capability is enriched and richer service capabilities are provided to the third-party application, so that the whole ecological chain flourishes.

Figure 6:
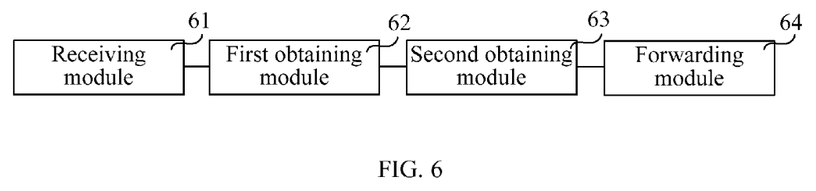
FIG. 6 is a schematic structural diagram of an embodiment of a service opening server according to the present invention.

FIG. 6 is a schematic structural diagram of an embodiment of a service opening server according to the present invention. As shown in FIG. 6, this embodiment includes a receiving module 61, a first obtaining module 62, a second obtaining module 63 and a forwarding module 64.

The receiving module 61 receives a service request from a third-party application, where the service request carries type information of a requested service and parameter information of the requested service; the first obtaining module 62 queries, according to the type information of the service, a service directory to obtain an access address and authentication type information of the service; when it is determined, according to the authentication type information, that the service needs to be requested with an authorization of the end user, the second obtaining module 63 obtains an authorization notification message of the end user according to the type information of the service and the parameter information of the service; and the forwarding module 64 forwards, according to the access address, the service request to a capability server, and forwards, to the third-party application, a service response message returned by the capability server.

In the service opening server provided by the embodiment of the present invention, when it is determined, according to the authentication type information, that the invoking of a requested service needs an authorization of an end user, the second obtaining module 63 obtains an authorization notification message of the end user according to the type information of the requested service and the parameter information of the requested service. In this manner, the control of the client on the authorized service is ensured to the greatest extent, and an untrusted third-party application is effectively prevented from violating interests of the end user, thereby ensuring the interests of the end user.

Figure 7:
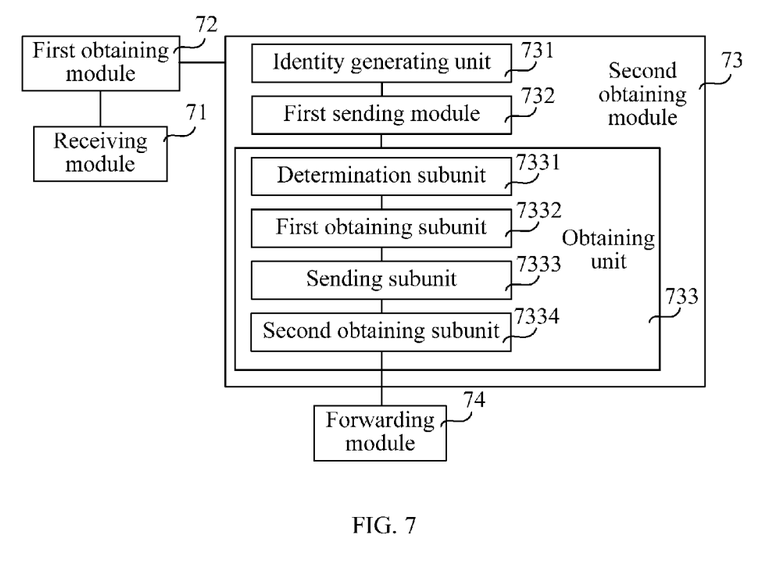
FIG. 7 is a schematic structural diagram of another embodiment of a service opening server according to the present invention.

FIG. 7 is a schematic structural diagram of another embodiment of a service opening server according to the present invention. As shown in FIG. 7, this embodiment includes a receiving module 71, a first obtaining module 72, a second obtaining module 73 and a forwarding module 74.

The receiving module 71 receives a service request from a third-party application, where the service request carries type information of a requested service and parameter information of the requested service; the first obtaining module 72 queries, according to the type information of the service, a service directory to obtain an access address and authentication type information of the service; when it is determined, according to the authentication type information, that the invoking of the service needs an authorization of the end user, the second obtaining module 73 obtains an authorization notification message of the end user according to the type information of the service and the parameter information of the service; and the forwarding module 74 forwards, according to the access address, the service request to a capability server, and forwards, to the third-party application, a service response message returned by the capability server.

Furthermore, the second obtaining module 73 may further include an identity generating unit 731, a first sending unit 732, and an obtaining unit 733. The identity generating unit 731 generates, according to the parameter information, a parameter identity corresponding to the parameter information; the first sending unit 732 sends an authentication address carrying the type information and the parameter identity to a client through the third-party application; and the obtaining unit 733 obtains an authorization notification message, where the authorization notification message is confirmed by the end user through the authentication address.

Furthermore, the obtaining unit 733 may further include a determination subunit 7331, a first obtaining subunit 7332, a sending subunit 7333, and a second obtaining subunit 7334. The determination subunit 7331 determines whether the authentication address is modified; if it is determined that the authentication address is not modified, the first obtaining subunit 7332 obtains password information that is sent by the end user through the authentication address; and if the password information is successfully verified, the sending subunit 7333 sends description information and parameter information of the requested service to the client; and the second obtaining subunit 7334 obtains an authorization notification message, where the authorization notification message is sent by the end user according to the description information and the parameter information.

Furthermore, the second obtaining subunit 7334 may further include a first obtaining device, a second obtaining device and a sending device. The first obtaining device queries, according to the type information, the service directory to obtain the description information; the second obtaining device obtains, according to the parameter identity, the parameter information carried in the service request; and the sending device sends the description information and parameter information to the client.

Furthermore, if the service request carries a callback address, the forwarding module 74 may further include a second sending unit, configured to forward, to a third-party application corresponding to the callback address, a service response message returned by the capability server.

In the service opening server provided by the embodiment of the present invention, when it is determined, according to the authentication type information, that the invoking of a requested service needs an authorization of an end user, the second obtaining module 63 obtains an authorization notification message of the end user according to the type information of the requested service and the parameter information of the requested service. In this manner, the control of the client on the authorized service is ensured to the greatest extent, and an untrusted third-party application is effectively prevented from violating interests of the end user, thereby ensuring the interests of the end user.

Figure 8:
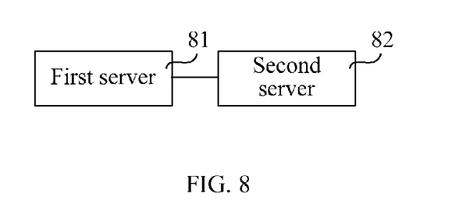
FIG. 8 is a schematic structural diagram of an embodiment of a service opening system according to the present invention.

FIG. 8 is a schematic structural diagram of an embodiment of a service opening system according to the present invention. As shown in FIG. 8, this embodiment includes a first server 81 and a second server 82 on which a third-party application is hosted. The first server 81 may be the service opening server in the embodiment shown in the FIG. 6 or FIG. 7.

The first server 81 receives a service request from the third-party application hosted on the second server 82, where the service request carries type information of a requested service and parameter information of the request service; the first server 81 queries, according to the type information of the service, a service directory to obtain an access address and authentication type information of the service; if it is determined, according to the authentication type information, that the invoking of the service needs an authorization of an end user, the first server 81 obtains an authorization notification message of the end user according to the type information of the service and the parameter information of the service; and the first server 81 forwards, according to the access address, the service request to a capability server, and forwards, to the third-party application on the second server 82, a service response message returned by the capability server.

In the service opening system provided by the embodiment of the present invention, when it is determined, according to the authentication type information, that the invoking of a requested service needs an authorization of an end user, the first server 81 obtains an authorization notification message of the end user according to the type information of the requested service and the parameter information of the requested service. In this manner, the control of the client on the authorized service is ensured to the greatest extent, and an untrusted third-party application is effectively prevented from violating interests of the end user, thereby ensuring the interests of the end user.

Through the technical solutions according to the embodiments of the present invention, the problem of service opening which needs an authorization of an end user is ensured and solved. Furthermore, the embodiments of the present invention show details such as service parameter of operations on authorized service resources to an end user. Therefore, the control of the end user on authorized resources is ensured to the greatest extent, and technically, an untrusted third-party application is effectively prevented from violating interests of the end user, thereby ensuring the interests of the end user. In addition, the opening scale of the service capability is enriched and richer service capabilities are provided to the third-party application, so that the whole ecological chain flourishes.

It can be clearly understood by persons skilled in the art that, for the purpose of convenient and brief description, for a detailed working process of the foregoing systems, devices, modules and units, reference may be made to the corresponding process in the method embodiments, and the details are not be described herein again.

Persons of ordinary skill in the art should understand that all or a part of the steps according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the spirit and scope of the present invention.

What is claimed is:

1. A service opening method performed by a capability opening management and control unit which comprises a hardware processor, comprising:

receiving a request for a second service from a third-party application, wherein the request for the second service is generated and sent by the third-party application when the third-party application receives a request for a first service from an end user and determines that the first service needs service provided by the second service, and wherein the request for the second service carries type information of the second service and parameter information of the second service;

according to the type information of the second service, querying a service directory to obtain an access address and authentication type information of the second service; and when it is determined, according to the authentication type information, that invoking of the second service needs an authorization of the end user, according to the type information of the second service and the parameter information of the second service, obtaining an authorization notification message of the end user; and according to the access address, forwarding the request for the second service to a capability server, and forwarding, to the third-party application, a service response message returned by the capability server;

wherein the obtaining the authorization notification message of the end user according to the type information of the second service and the parameter information of the second service comprises:

according to the parameter information, generating a parameter identity to the parameter information;
sending an authentication address carrying the type information and the parameter identity to a client through the third-party application; and
obtaining the authorization notification message, wherein the authorization notification message is confirmed by the end user through the authentication address;
wherein the obtaining the authorization notification message, wherein the authorization notification message is confirmed by the end user through the authentication address comprises:
determining whether the authentication address is modified;
if it is determined that the authentication address is not modified, obtaining password information, wherein the password information is sent by the end user through the authentication address;
if the password information is successfully verified, sending description information and the parameter information of the second service to the client and
obtaining the authorization notification message, wherein the authorization notification message is sent by the end user according to the description information and the parameter information.

2. The method according to claim 1, wherein the sending the description information and the parameter information of the second service to the client comprises:
according to the type information, querying the service directory to obtain the description information;
according to the parameter identity, obtaining the parameter information carried in the request for the second service; and
sending the description information and the parameter information to the client.

3. The method according to claim 1, wherein the forwarding, to the third-party application, the service response message returned by the capability server comprises:
if the service request carries a callback address, forwarding, to a third-party application corresponding to the callback address, the service response message returned by the capability server.

4. A service opening server, comprising:
a hardware processor to implement:
receiving a request for a second service from a third-party application, wherein the request for the second service is generated and sent by the third-party application when the third-party application receives a request for a first service from an end user and determines that the first service needs service provided by the second service, and wherein the request for the second service carries type information of the second service and parameter information of the second service;
querying, according to the type information of the second service, a service directory to obtain an access address and authentication type information of the second service;
when it is determined, according to the authentication type information, that invoking of the second service needs an authorization of the end user, obtaining an authorization notification message of the end user according to the type information of the second service and the parameter information of the second service; and
forwarding, according to the access address, the request for the second service to a capability server, and forwarding, to the third-party application, a service response message returned by the capability server;
wherein the hardware processor further implements:
generating, according to the parameter information, a parameter identity corresponding to the parameter information;
sending an authentication address carrying the type information and the parameter identity to a client through the third-party application; and
obtaining the authorization notification message, wherein the authorization notification message is confirmed by the end user through the authentication address;
wherein the hardware processor further implements;
determining whether the authentication address is modified;
if it is determined that the authentication address is not modified, obtaining password information, wherein the password information is sent by the end user through the authentication address;
if the password information is successfully verified, sending description information and the parameter information of the second service to the client; and
a second obtaining subunit, configured to obtain the authorization notification message, wherein the authorization notification message is sent by the end user according to the description information and the parameter information.

5. The server according to claim 4, wherein the hardware processor further implements:
querying, according to the type information, the service directory to obtain the description information;
obtaining, according to the parameter identity, the parameter information carried in the request for the second service; and
sending the description information and the parameter information to the client.

6. The server according to claim 4, wherein the hardware processor further implements:
forwarding, to a third-party application corresponding to the callback address, the service response message returned by the capability server, when the service request carries a callback address.

7. A service opening system, comprising a first server and a second server on which a third-party application is hosted, wherein the first server is a service opening server, wherein the first server comprises a hardware processor to implement:
receiving a request for a second service from a third-party application, wherein the request for the second service is generated and sent by the third-party application when the third-party application receives a request for a first service from an end user and determines that the first service needs the service provided by the second service, and wherein the request for the second service carries type information of a second service and parameter information of the second service;
querying, according to the type information of the second service, a service directory to obtain an access address and authentication type information of the second service;
when it is determined, according to the authentication type information, that invoking of the second service needs an authorization of the end user, obtaining an authorization notification message of the end user according to the type information of the second service and the parameter information of the second service; and
forwarding, according to the access address, the request for the second service to a capability server, and forwarding, to the third-party application, a service response message returned by the capability server;

wherein the hardware processor further implements:
generating, according to the parameter information, a parameter identity corresponding to the parameter information;
sending an authentication address carrying the type information and the parameter identity to a client through the third-party application; and
obtaining the authorization notification message, wherein the authorization notification message is confirmed by the end user through the authentication address;
wherein the hardware processor further implements:
determining whether the authentication address is modified;
if it is determined that the authentication address is not modified, obtaining password information, wherein the password information is sent by the end user through the authentication address;
if the password information is successfully verified, sending description information and the parameter information of the second service to the client; and
a second obtaining subunit, configured to obtain the authorization notification message, wherein the authorization notification message is sent by the end user according to the description information and the parameter information;
wherein the first server receives the request for the second service from the third-party application hosted on the second server, wherein the request for the second service carries type information of the second service and the parameter information of the second service; the first server queries, according to the type information of the second service, the service directory to obtain the access address and the authentication type information of the second service; when it is determined, according to the authentication type information, that invoking of the second service needs the authorization of the end user, the first server obtains the authorization notification message of the end user according to the type information of the second service and the parameter information of the second service; and the first server forwards, according to the access address, the request for the second service to the capability server, and forwards, to the third-party application, the service response message returned by the capability server.

* * * * *

UNITED STATES PATENT AND TRADEMARK OFFICE
CERTIFICATE OF CORRECTION

| | | |
|---|---|---|
| PATENT NO. | : 8,584,231 B2 | Page 1 of 1 |
| APPLICATION NO. | : 13/621554 | |
| DATED | : November 12, 2013 | |
| INVENTOR(S) | : Xianjun Zou | |

It is certified that error appears in the above-identified patent and that said Letters Patent is hereby corrected as shown below:

On the Title page, Item (72), Applicant's City of Residence "Guangdong (CN)" should read -- Shenzhen (CN) --.

Signed and Sealed this
Eighth Day of April, 2014

Michelle K. Lee
*Deputy Director of the United States Patent and Trademark Office*